Patented Feb. 12, 1946

2,394,578

UNITED STATES PATENT OFFICE 2,394,578

RECLAMATION OF TOOL STEEL SCRAP

John Wulff, Cambridge, Mass.

No Drawing. Application March 16, 1943,
Serial No. 479,394

4 Claims. (Cl. 209—214)

This invention relates to the reclamation of high speed tool steel scrap and similar alloy scrap material.

As is known, there are a number of different analyses of high speed tool steels. Prior to the war when alloying materials were readily available, the typical tool steels carried a high tungsten content, a typical analysis containing about 18% tungsten. With the advent of the war, tungsten among other things, became quite critical. To relieve this condition tool steelmakers experimented with different analyses their desideratum being to materially diminish the amount of tungsten employed. As a result of such work the new tool steels now generally employed were evolved. These comprise a series of special analyses of tungsten, molybdenum, chromium and vanadium. While the percentages of these several ingredients vary a typical analyses contains about 5% tungsten, 5% of molybdenum, 4% chromium and 1% vanadium.

There are a number of special analyses in which these percentages vary considerably. Since both the tungsten and molybdenum contained in these tool steels are critical their loss through the medium of unreclaimed scrap is very serious.

The scrap developed from such tool steels is of two general types. The first is a fairly clean scrap derived from cropping of the billets. This material is contaminated with abrasives and other products used in the cropping operation. The second type of scrap is a relatively fine powder derived from cutting and milling operations. This scrap is a sludge-like material which is contaminated with dirt, abrasive particles from the cutting tools (such as silicon carbide and alumina) and cutting oil.

To date there has been no effective method of treating such scrap. In all the prior attempts the product which was produced was still highly contaminated, containing too much carbon and abrasive material to safely warrant the addition of the reclaimed material to a high speed tool steel melt.

As a result of extensive experimentation it has been found that this material may be effectively processed to produce a clean grade of scrap which is practically free of contaminants. According to the improved process coarse grindings may be processed to produce a clean concentrate containing less than .3% of metallic oxides and a relatively low percentage of metallic oxides. These latter are in no way harmful since they readily reduce in the carbon arc furnace. The fine grinding scrap or sludge similarly may be processed according to the invention to produce products which may be directly added to a melt to thereby recover and utilize the valuable tungsten, molybdenum, chromium and vanadium contents. This processed material may be produced under the invention with less than 1% abrasive with a satisfactorily low carbon content.

In carrying out the invention the grinding scrap which is to be treated is taken from a bin or other storage by a suitable feeder and passed to a vat or other vessel in which it is given a chemical treatment. The vat or tank is preferably provided with an agitator and the grindings are contacted therein with a hot aqueous solution of soda ash and anhydrous sodium silicate. In lieu of the soda ash other suitable effective reagents may be employed. In order to assist in freeing the metallic particles from adherent carbonaceous material suitable wetting agents may be added to the treating reagent. While in the vat or tank the solution is raised to the boiling point and the pulp is thoroughly agitated. After treatment in the tank for a sufficient period of time to emulsify the oleaginous material the pulp is pumped off and passed to a ball mill. In the chemical treating stage, as will be appreciated, the oleaginous material which adheres to the metallic particles is emulsified and floats to the surface as a scum. This may be skimmed or decanted off either continuously or intermittently.

In the ball mill the partially cleaned pulp is subjected to tumbling and grinding action which serves to separate and remove oxides, abrasives and the residual grease or oil. The pulp density of the material may be controlled so as to secure the optimum detergent effect and the speed of the mill is regulated to insure effective removal of oxides and abrasives from the surface of the metallic particles. The material in the mill is then pumped or allowed to flow by gravity to a screw or cone classifier. In passage through the classifier most of the residual scum, i. e., the emulsified oil, is removed.

The material from the classifier is then discharged into a settling tank. In this tank the solids gravitate to the bottom and residual emulsified material floats to the top. If desired, suitable detergents may be added to the liquid in the settling tank to insure removal of any residual emulsified oil from the metal particles.

The cleansed metal is removed from the settling tank in any desired manner, as for example, by a screw discharge at the bottom. The discharge material then may be treated in one of two ways. In the first method the wet material from the bottom of the settling tank is immediately treated to separate the metallic and non-metallic fractions. For this purpose it is passed to a wet magnetic separator and the concentrate from the separator is charged to a drier. If a dry magnetic separator is employed the cleansed material from the bottom of the settling tank is passed by way of a chute or other conveying mechanism to a drier. In the chute some dewatering is effected and the remaining water is evaporated in the drier. The material from the drier then goes directly to a dry magnetic separator in which abrasive and other non-metallics are cleanly separated from the metallic particles. The dry concentrate recovered from either the wet magnetic or dry magnetic separator may then be utilized directly as an addition agent to a high speed tool steel heat. For this purpose the clean powder may be packed loosely in cans or other suitable containers or, if desired, it may be briquetted under a suitable pressure and annealed under reducing conditions to give a mechanically strong briquette. Similarly, if desired, the cleaned powder may be briquetted with a suitable binding agent such as lime, which will have no deleterious action in the melt.

In the operation of the process the drier is preferably run at a high temperature and with an inert gas atmosphere. Preferably a CO—$CO_2$ or CO—H atmosphere is employed so as to eliminate the last vestiges of oil. The tails which are discarded from the magnetic separator may, if desired, be classified and fractionated so as to produce reusable alumina or silicon carbide abrasives.

The metallic concentrate produced by the described process is of peculiar utility in the powder metallurgy field as well as, as noted, being immediately available for addition to a heat of substantially the same analysis.

The high speed steel powder produced according to the method has a peculiar structure which renders it peculiarly useful for the manufacture of compacts and particularly those to be employed for bearings and friction materials. The particles are relatively spicular having a hooklike end. Such powder, produced from fine grinding concentrate, may be pressed to about 15 tons per sq. in. to give a compact of excellent definition and characterized by sharp edges. When such a powder is annealed in dry hydrogen between 1000° F. and 1700° F. for about one-half hour and then slowly cooled, excellent mechanical properties are imparted.

The peculiar structure of the powder, above mentioned, helps by mutual interlocking of the particles to form a very rigid net work structure. This makes it not only ideally suited for the manufacture of bearings and friction materials but also provides an excellent matrix for the reception of other powder addition agents. Where high densities are required for the ultimate use of the material it is desirable to sinter at elevated temperatures preferably between about 1100° C. and 1250° C.

This type of powder, as noted, makes an excellent component in a friction material. These materials may be made up by incorporating with the tool steel powder suitable addition agents such as powdered copper, lead or graphite. The combination of the reclaimed steel powder and copper makes possible the production of a compact of desirably low porosity.

In making up powder compacts the steel powder may be first pressed and then annealed or to improve the pressing conditions it may be annealed in hydrogen at temperatures of the order of 1000° to 1700° F. for about one-half hour and slowly cooled after which it may be pressed at relatively low pressures to give excellent compacts.

The reclaimed powder may be treated in a number of ways to render it more useful for the production of given articles. For example, in making the compact of the tool steel powder and copper the steel particles may first be coated with copper, before compression, by immersion plating and grinding with copper.

Where low melting components are utilized in admixes with the tool steel powder the sintering temperatures should be correspondingly adjusted. For example, in the case of additions of lead and copper sintering should not be carried out at temperatures much above 1500° F. because of the tendency of the lead to sweat out. However, due to the spongy net work of the tool steel compact the lead would have less tendency to sweat out than from a matrix of equiaxed particles.

To facilitate the production of wear resistant parts from the high speed tool steel powder it is sometimes advantageous to admix some other ferrous powder, such for example, as white cast iron, which melts at the sintering temperature. This aids materially in the densification of the product during sintering.

As will be appreciated the peculiar structure of the reclaimed powder permits the manufacture of porous articles with great ease. By utilizing low pressures and short sintering times strong articles having a very high porosity can be fabricated. For example, from the tungsten high speed tool steel powder there have been made sintered compacts of very high strength having a density of 4.1 in one case and 4.9 in another. This material was produced by heating in hydrogen at 1100° C. and furnace cooling. In these circumstances there was very little change in the dimension of the compact. Thus it will be observed that the present invention is of utility not only as a means of reclaiming critical material for use as a remelting scrap but, equally importantly, for the production of tool steel powder of such special physical characteristics as to render it peculiarly useful for the production of powder metal compacts composed either entirely of the tool steel or of the tool steel with any predetermined mixtures of other powders.

I claim:

1. A method of producing tool steel powder from contaminated tool steel grinding scrap which comprises, emulsifying the oleaginous material associated with the scrap with a solution of soda ash and sodium silicate, subjecting the scrap to a disintegrating action, removing residual emulsified material from the solid particles, drying the solid material at high temperature and in a reducing atmosphere and subjecting the dried material to magnetic separation to obtain a metallic powder substantially free from abrasive material.

2. A method of producing tool steel powder from contaminated tool steel grindings which comprises, treating the grindings with a hot aqueous solution of soda ash and sodium silicate, separating the emulsified material from the solid particles, disintegrating the particles, in an aqueous phase, in a ball mill, separating residual emulsified material from the disintegrated solids, and subjecting the solids to wet magnetic separation to obtain metallic powder substantially free from abrasives.

3. A process in accordance with claim 2 in which the separated metallic powder is heat treated in a reducing atmosphere.

4. A method of producing tool steel powder from contaminated tool steel grindings which comprises, treating the grindings with a hot aqueous solution of soda ash and sodium silicate, separating the emulsified material from the solid particles, disintegrating the particles, in an aqueous phase, in a ball mill, separating residual emulsified material from the disintegrated solids, drying the solids at elevated temperature and in a reducing atmosphere, and subjecting the dried material to magnetic separation to obtain metallic particles substantially free from abrasives.

JOHN WULFF.